(12) United States Patent
Verma et al.

(10) Patent No.: US 11,461,734 B2
(45) Date of Patent: Oct. 4, 2022

(54) SENSOR BASED PRODUCT ARRANGEMENT

(71) Applicant: KYNDRYL, INC., New York, NY (US)

(72) Inventors: Pramod Verma, Fairfax, VA (US); Rachel Leekin, White Plains, NY (US); Seema Nagar, Bangalore (IN); Kuntal Dey, New Delhi (IN)

(73) Assignee: KYNDRYL, INC., New York, NY (US)

( * ) Notice: Subject to any disclaimer, the term of this patent is extended or adjusted under 35 U.S.C. 154(b) by 101 days.

(21) Appl. No.: 16/440,644

(22) Filed: Jun. 13, 2019

(65) Prior Publication Data

US 2020/0394598 A1 Dec. 17, 2020

(51) Int. Cl.
*G06Q 10/08* (2012.01)
*G06N 20/00* (2019.01)
*G06N 5/04* (2006.01)

(52) U.S. Cl.
CPC .................... *G06Q 10/087* (2013.01)

(58) Field of Classification Search
CPC .................................................. G06Q 10/087
USPC .......................................................... 705/28
See application file for complete search history.

(56) References Cited

U.S. PATENT DOCUMENTS

| | | |
|---|---|---|
| 7,289,102 B2 | 10/2007 | Hinckley et al. |
| 7,693,757 B2 | 4/2010 | Zimmerman |
| 8,321,303 B1 | 11/2012 | Krishnamurthy et al. |
| 9,727,838 B2 | 8/2017 | Campbell |
| 10,885,493 B2* | 1/2021 | Hassan ..................... G06K 9/78 |
| 2009/0248198 A1* | 10/2009 | Siegel ................... G06Q 10/08 700/231 |
| 2010/0138037 A1* | 6/2010 | Adelberg ................ G07F 9/026 700/241 |
| 2011/0050396 A1 | 3/2011 | Chaves |

(Continued)

FOREIGN PATENT DOCUMENTS

| | | |
|---|---|---|
| DE | 202005007089 U1 | 7/2005 |
| JP | 2016103208 A * | 6/2016 |
| WO | 2008118501 A3 | 1/2009 |

OTHER PUBLICATIONS

Moorthy et al., "Applying Image Processing for Detecting On-Shelf Availability and Product Positioning in Retail Stores", WCI' 15, Aug. 10-13, 2015, 7 pages.

(Continued)

*Primary Examiner* — Luna Champagne
(74) *Attorney, Agent, or Firm* — Erik Swanson; Andrew M. Calderon; Roberts Calderon Safran & Cole, P.C.

(57) ABSTRACT

A computer-implemented method includes: determining, by a computer device, initial locations of products in a repository; determining, by the computer device, an initial arrangement of the products based on the initial locations; determining, by the computer device, current locations of the products in the repository; determining, by the computer device and based on the initial locations and the current locations, that one of the products is moved away from its home location; determining, by the computer device and based on the determining the one of the products is moved away from its home location, that the one of the products is misplaced based on predefined conditions being satisfied; and generating, by the computer device, an alert based on the determining the one of the products is misplaced.

19 Claims, 4 Drawing Sheets

(56) References Cited

U.S. PATENT DOCUMENTS

| | | | |
|---|---|---|---|
| 2014/0089243 A1* | 3/2014 | Oppenheimer | G08B 21/0275 |
| | | | 706/46 |
| 2014/0344118 A1 | 11/2014 | Parpia et al. | |
| 2016/0119540 A1 | 4/2016 | Wu | |
| 2017/0032311 A1 | 2/2017 | Rizzolo et al. | |
| 2018/0181909 A1* | 6/2018 | Wilkinson | G06Q 10/0833 |
| 2018/0336513 A1* | 11/2018 | Smith | G05B 19/406 |
| 2019/0102686 A1* | 4/2019 | Yang | G06N 20/00 |
| 2019/0236531 A1* | 8/2019 | Adato | G06Q 10/087 |

OTHER PUBLICATIONS

Chaves et al., "Finding Misplaced Items in Retail by Clustering RFID Data", EDBT 2010, Mar. 22-26, 2010, 12 pages.

Zhu et al., "Mean-Variance Analysis of Retailers Deploying RFID-Enabled Smart Shelves", Information, 2018, vol. 9, Issue 40, 14 pages.

\* cited by examiner

SENSOR BASED PRODUCT ARRANGEMENT

BACKGROUND

The present invention relates generally to product arrangement in a repository and, more particularly, to sensor based product arrangement in a repository.

In physical repositories such as stores or warehouses, it is typically advantageous to have products located in the repository so as to be easily visible and accessible to users or customers in order to maximize exposure of the products to the users or customers.

SUMMARY

In a first aspect of the invention, there is a computer-implemented method including: determining, by a computer device, initial locations of products in a repository; determining, by the computer device, an initial arrangement of the products based on the initial locations; determining, by the computer device, current locations of the products in the repository; determining, by the computer device and based on the initial locations and the current locations, that one of the products is moved away from its home location; determining, by the computer device and based on the determining the one of the products is moved away from its home location, that the one of the products is misplaced based on predefined conditions being satisfied; and generating, by the computer device, an alert based on the determining the one of the products is misplaced.

In another aspect of the invention, there is a computer program product including a computer readable storage medium having program instructions embodied therewith. The program instructions are executable by a computing device to cause the computing device to: determine initial locations of products in a repository; determine an initial arrangement of the products based on the initial locations; determine current locations of the products in the repository; determine, based on the initial locations and the current locations, that one of the products is moved away from its home location; determine, based on the determining the one of the products is moved away from its home location and based on predefined conditions being satisfied, that the one of the products is misplaced; and generate an alert based on the determining the one of the products is misplaced.

In another aspect of the invention, there is system including a processor, a computer readable memory, and a computer readable storage medium. The system includes: program instructions to determine initial locations of products in a repository; program instructions to determine an initial arrangement of the products based on the initial locations; program instructions to determine current locations of the products in the repository; program instructions to determine, based on the initial locations and the current locations, that one of the products is moved away from its home location; program instructions to determine, based on the determining the one of the products is moved away from its home location and based on predefined conditions being satisfied, that the one of the products is misplaced; and program instructions to generate an alert based on the determining the one of the products is misplaced. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to product arrangement in a repository and, more particularly, to sensor based product arrangement in a repository. In embodiments, the repository is a retail store or a warehouse. In physical repositories such as stores or warehouses, it is typically advantageous to locate the various products offered for purchased to be exposed so as to be easily visible and accessible to users or customers.

However, it is typically difficult to consistently keep track of the arrangement of a large number of products within a repository such as a retail store or a warehouse, particularly in large stores that are open to the public or large warehouses with a number of employees. The difficulty is increased when foot traffic in the retail store or warehouse is large. In addition, most automated systems currently available are not typically able to adequately manage product location in a repository, and when automated systems are capable of managing product locations in a retail store, these automated systems are typically expensive to purchase and operate. Accordingly, maintaining a consistent arrangement of products within a repository over time is currently a challenge to typical product repository managers, and achieving such arrangement is advantageous to product repository managers.

According to aspects of the invention, a method includes detecting and tracking the locations of products throughout a repository, such as a retail store or a warehouse, using sensor instrumentation, e.g., by affixing sensors to the products in the repository as well as placing static sensors at various static locations throughout the repository. The method also includes tracking the sensor movements, as well as inter-sensor distances, to determine the locations of the products over time. In embodiments and in the example of a retail store, the method also detects product checkout by integrating the method with the retail store checkout process.

In embodiments, implementations of the invention also include estimating the visibility of each product in the repository by integrating the product-affixed sensors and the static sensors with the topology of the repository, along with knowledge of the available amounts of the products in the retail store or in inventory. Accordingly, if a smaller product is misplaced behind a larger product, and alert is sent to a repository manager, and the manager may take a corrective action such as rearranging the locations of either one of the small product or the large product.

Embodiments of the invention improve the ability to control product arrangement in a repository by intermittently obtaining the location of each product, and providing an alert should one or more products be at a different location from the original location thereof for a period of time. Embodiments of the invention employ an unconventional arrangement of steps including: determining an initial location of products in a repository; determining an initial arrangement of the products based on the initial location; determining, using sensors, current locations of the products; determining, using the sensors, that one of the products has been moved away from its home location; determining that the one of the products satisfies criteria for generating a movement alert; and generating the alert. The steps themselves are unconventional, and the combination of the steps is also unconventional. For example, a number of the steps create new information that does not exist in the system, and this new information is then used in subsequent steps in an unconventional manner.

According to aspects of the invention, a method of controlling product arrangement in a repository includes detecting absolute arrangements of products in the repository via the static sensors located throughout the repository, detecting relative arrangements of products in the repository with respect to each other via product-affixed sensors, specifying and maintaining pattern-level organization of the products, that is, allowing repository managers to specify a pattern of relative arrangements of products, determining whether the arrangement is maintained, and notifying repository managers if the specified arrangement patterns are violated, or violated for a sufficient period of time without the product being checked out, and maintaining the visibility of products on shelves in repositories. In embodiments, the method includes integrating the repository topology to ensure that the products are initially placed in a visible manner by a repository manager or employee, and subsequently tracking the relative positions of the products over time. The method also includes inferring, using the known product sizes and tracker location, the visibility of each product.

In accordance with embodiments described herein, the method includes equipping the products with sensors, placing static sensors at various locations in the repository, enabling inter-sensor interactions between the product-affixed sensors and between the product-affixed sensors and the static sensors. In this manner, a system that implements the method associates each sensor ID with a product code for the product to which the sensor is affixed, and integrates the sensor IDs the repository checkout system to determine whether a product that has been moved from an initial location to a different location has been checked out by a customer.

In implementations of embodiments described herein, the method includes equipping the repository with fixed-location sensors, such as a set of sensors affixed to defined locations in the repository. In embodiments, the locations are fed into the calculation system of the repository, thus capturing the sensor coordinates of each one of the active sensors in the repository, which includes the static sensors and the product-affixed sensors. When a product has been checked out, the sensor affixed to that product is removed at check-out, and the sensor is then rendered inactive. As such, the method no longer feeds that inactive sensor information in the calculation system of the repository. The sensor affixed to that product is removed at check-out by a person, or automatically.

According to further aspects described herein, the method includes equipping products with product-identifier-integrated sensors. In embodiments, each product is affixed with a sensor, and each sensor is identified with a sensor ID. Each product is also identified with an ID, and the ID of the product is associated with the ID of the sensor. In embodiments, an initial arrangement of the products in the repository is specified. For example, a human-computer active interface may be used for a visual, textual or physical interaction with a human repository manager, by which the repository manager specifies the location of each product in the repository. As a result, a remote information transfer is carried out between the repository server and the sensors, including the static sensors and the product-affixed sensors. As a result, the location the products in the repository is received by, and stored in, the sensors. In embodiments, each of the product-affixed sensors is notified of the location of the product to which the sensor is affixed, as well as the locations of other products. This may be accomplished by each of the product-affixed sensors being notified of their distance to other product-affixed sensors and to the static sensors, the distance being determined as Euclidean distance between the corresponding product and other products. In further embodiments, the method includes specifying an incremental (delta) change of arrangement of the products in the repository. In this manner, each time a product is moved to a different location within the repository, the updated location is specified by the repository manager to a central server, and the updated specification triggers a calculation at the server to re-calculate the distances of other products with respect to the product that was moved.

In accordance with aspects of the invention, the system checks absolute arrangements of products and, in particular checking and tracking the absolute location within the repository where a given product is currently located, via a tracking module, and feeding the absolute location back to a repository at a server database. In embodiments, the original location where the product is typically located, according to the original repository specification, is treated as the home location of the product. In this manner, if a product is found at a location other than its home location, then the product is treated as being at a visiting location, and the duration of that product being at the visiting location is recorded.

According to even further aspects of the invention, the system checks the relative arrangements of the products in the repository and, in particular, determining the relative arrangement of a product, using the current location of that product, with respect to the locations of the other products. In embodiments, the method includes computing the number of products for which the relative distance has not changed, and the number of products for which the relative distance has changed. In this manner, implementations include determining misplacement via shopping, product location/arrangement, and time thresholds. For example, for a product that is not at the home location for a sufficient time duration, e.g., longer than a threshold duration, if the number of products with respect to which the relative location of that product has changed is high enough, e.g., higher than a threshold number, and if the product ID corresponding the its affixed sensor is not present in the sales database (the product has not yet been sold), then a product misplacement event is triggered. In embodiments, the method includes sensing an alert when product misplacement is determined, the alert being passed to the repository manager(s).

Aspects of the invention include the system calibrating initial visibility of each product by estimating the relative location of that product in the repository with respect to the shelf on which the product is placed, with respect to the other products on that shelf, the size of the product, the size of the other products on that shelf, the relative locations of the other products on the shelf, and an initial estimate of visibility such as the zone of visibility and the visible portion of the product, given as input by the repository manager(s). In embodiments, the system determines locations of the neighboring products in order to maintain the visibility of the product that may be affected by incremental changes when, e.g., one or more neighboring products are removed or replaced by other products. In embodiments, the system determines the current visibility of the product and, when a product is moved, the system determines an updated visibility for that product as well as for the neighboring products. For each such determination, the system takes as input the location of the current product, the locations of the neighboring products, the sizes of the current product and of the neighboring products, and the earlier known zone of visibility for the current product.

In accordance with aspects of the invention, the system uses projection geometry to determine the occlusion(s) of the current product by one or more other neighboring product(s), when seen from the earlier zone of visibility. From this, the system infers the visibility of the current product. In embodiments, the system determines locations on the shelf where an acceptable visibility is required using the determined location of the current product to set inputs for the projection geometry calculation.

In an exemplary use case, a repository (such as a retail store, for example) arranges smartphones for sale on a shelf, the phones being arranged in a straight line on the shelf such that the oldest model, e.g., phone A, is at the back of the shelf, the next-oldest model, e.g., phone B, is adjacent to phone A, and so on, and the newest model of phone C is at the front of the shelf. A customer attempting to choose between phone C and phone B may pick up both items and then returns both items to the shelf, but wrongly place phone B ahead of phone C instead of behind phone C, as originally arranged by the retail store manager(s). In embodiments, the system detects this misplacement of the phone (relative to their initial arrangement) and sends an alert to the retail store manager based on the detecting.

In another exemplary use case, a repository (such as a retail store, for example) has three hangers of garments, a first hanger having long frocks from Brand A, a second hanger having skirts and tops from Brand B, and a third hanger having long divided skirts from Brand C. A customer tries on one item from each of the three hangers, and after choosing to purchase the Brand A long frock, wrongly places the Brand B skirt into the Brand C long skirt rack, and also leaves the Brand C garment in the fitting room. In embodiments, either immediately or after a desired period of time (e.g., a time threshold), the system detects the misplacement of the Brand B skirt and the Brand C garment, and sends an alert to the retail store manager(s), the alert including a report of two misplaced products (the Brand B skirt and the Brand C garment) and their respective current locations in the store. In this example, the system does not report the Brand A long frock as misplaced, because this garment does not satisfy the predefined condition for being misplaced. In particular, the sensors in the store detects that this garment is currently moving within the store and/or has been away from its home location for less than a pre-defined threshold amount of time, which implies that the customer is carrying the garment and/or still considering the garment for purchase. In embodiments, during that typical amount of time, the method instructs the static sensors as well as the product-affixed sensors that sense the Brand A long frock, to not send an alert or to not sense the location of that specific Brand A long frock.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
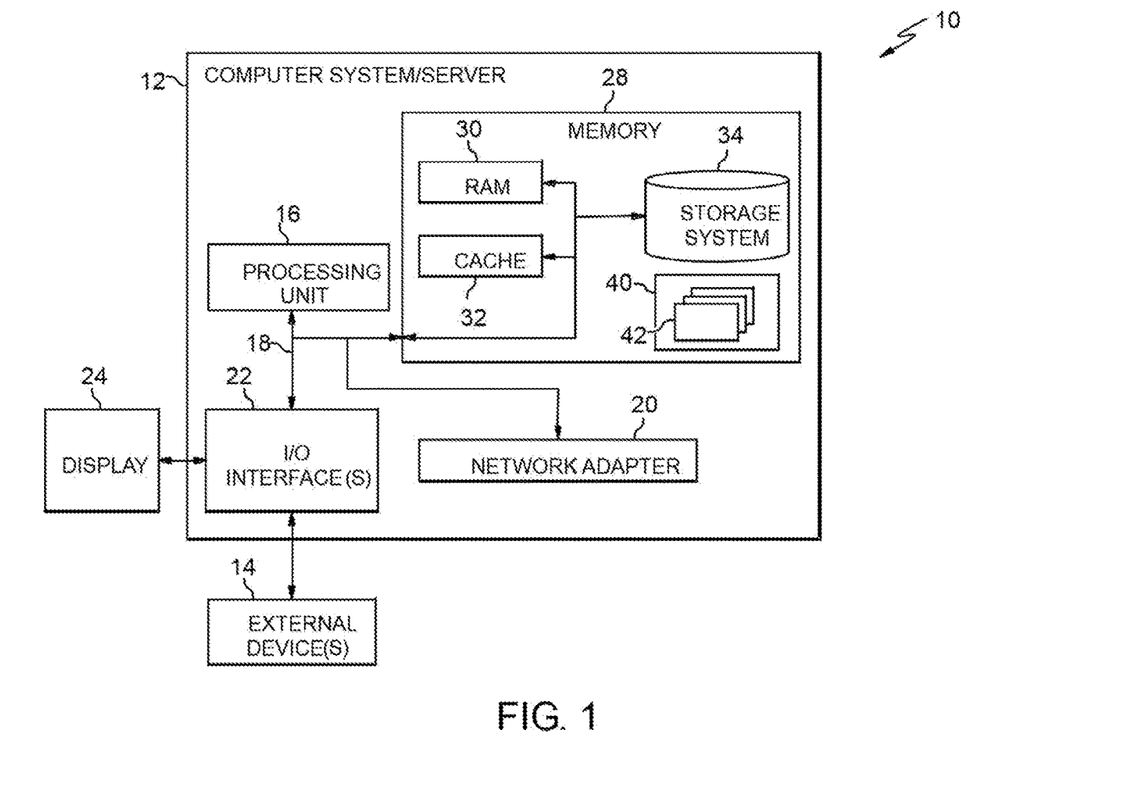
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
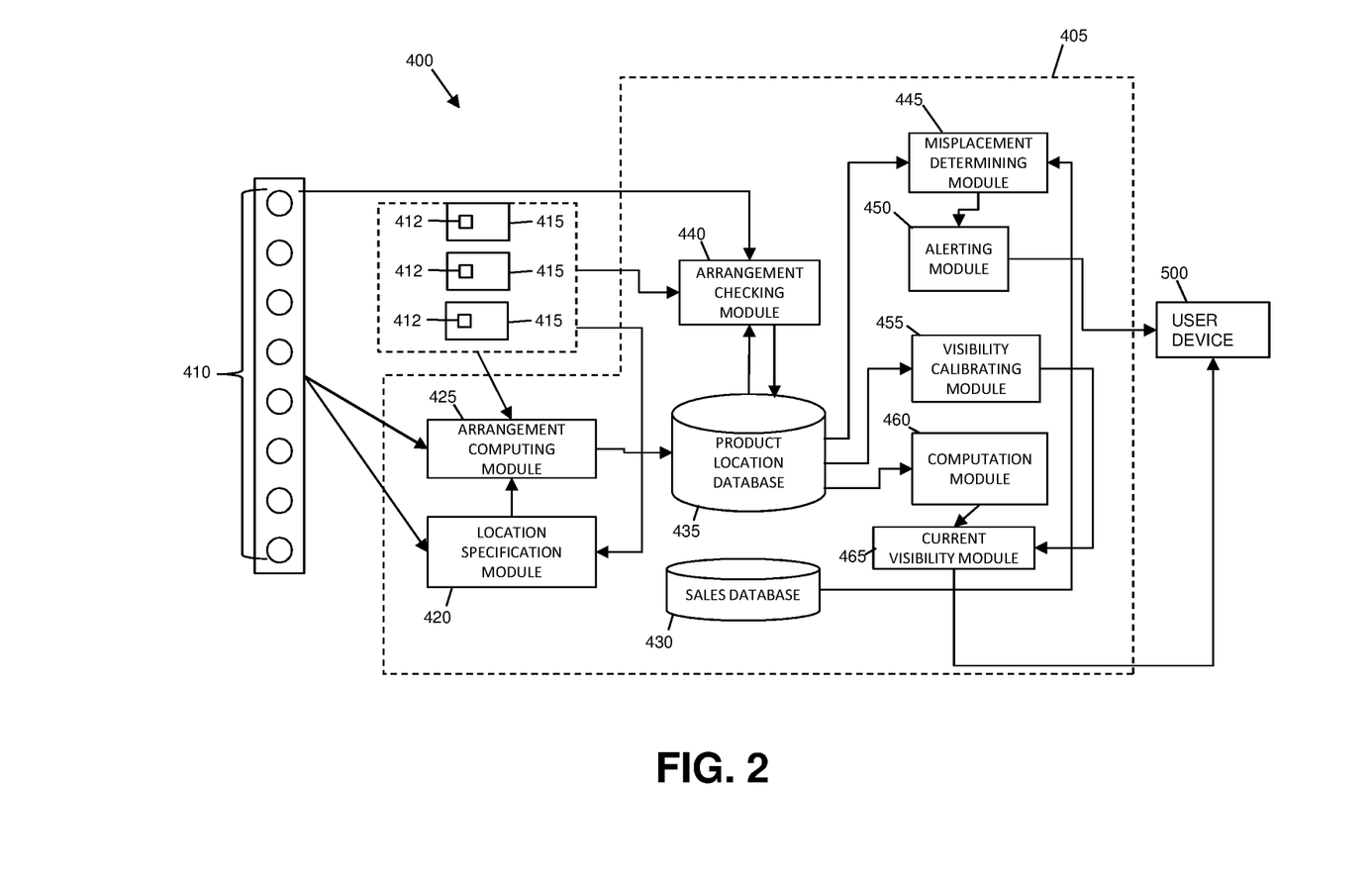
FIG. 2 shows a block diagram of an exemplary environment in accordance with aspects of the invention.

FIG. 2 shows a block diagram of an exemplary environment 400 in accordance with aspects of the invention. In embodiments, the environment 400 is part of a repository such as, for example, a retail store that is open to the public, a warehouse that is open to employees, or any other facility where a number of products are arranged and where one or more people have access to the facility and to the products. As shown in FIG. 2, the environment 400 includes a backend system 405, fixed-location sensors 410, respective product sensors 412 affixed to respective products 415, and a user device 500.

According to aspects of the invention, the fixed sensors 410 are configured to detect the location of products 415 in the repository. In implementations, each of the fixed sensors 410 is statically arranged at a defined location in the repository and is arranged to detect the location of one or more products 415 in the repository relative to the static location of the fixed sensor 410. In embodiments, the fixed sensors 410 comprise at least one selected from the group consisting of: global positioning system (GPS) sensors; camera sensors; radio-frequency identification document (RFID) readers; and indoor positioning sensors (IPS) configured to locate objects inside the repository using light, radio waves, magnetic fields, acoustic signals, or other sensory information. In embodiments, the IPS are configured to use different technologies, including distance measurement to nearby anchor nodes with known fixed positions, e.g. WiFi/LiFi (transmission via light emitting diodes) access points or Bluetooth beacons, magnetic positioning, and the like, using techniques such as triangulation. In embodiments, the IPS either actively locate mobile devices or provide static location ability.

According to aspects of the invention, each of the product sensors 412 is configured to store an identifier that defines the product 415 to which the product sensor 412 is attached.

In embodiments, each product sensor 412 is identified with an identity, each product 415 is also identified with an identity, and the identities of the respective products 415 are integrated with the identities of the product sensors 412. In embodiments, the product sensors 412 comprise sensors such as (but without limitation):

Image sensors: CCD (charge-coupled device) and CMOS (complementary metal-oxide semiconductor) imagers;

Proximity sensors: a device that detects the presence or absence of a nearby object, or properties of that object, and converts it into signal which can be easily read by user or a simple electronic instrument without getting in contact with them; proximity sensors are largely used in the retail industry, as they can detect motion and the correlation between the customer and product they might be interested in; in some implementations, a user is immediately notified of discounts and special offers of nearby products;

Motion detection sensors: a motion detector is an electronic device which is used to detect the physical movement (motion) in a given area and it transforms motion into an electric signal; motion of any object or motion of human beings; and Ultrasonic sensors: send out pulses of ultrasonic waves and measures the reflection off a moving object by tracking the speed of sound waves.

Still referring to FIG. 2, according to aspects of the invention, the backend system 405 is connected to the network (not shown) and configured to communicate with the fixed sensors 410 and the product sensors 412 via the network. The network may comprise any suitable computer network such as a LAN, WAN, and/or the Internet.

In embodiments, the backend system 405 comprises one or more elements of computer system 12 of FIG. 1, and is configured to perform functions described herein including: receive/obtain data from the fixed sensors 410 and the product sensors 412; determine and track locations of the products 415 within the repository based on the data from the sensors; and provide alerts to the user device 500 based on the determined locations of the products. The backend system 405 may comprise a single computer device or may comprise plural computer devices that operate together to perform one or more of the functions described herein.

In embodiments, the backend system 405 includes: a location specification module 420; an arrangement computing module 425; an arrangement checking module 440; a misplacement determining module 445; an alerting module 450; a visibility calibrating module 455; a computation module 460; and a current visibility module 465, each of which comprises one or more program modules such as program modules 42 described with respect to FIG. 1. The backend system 405 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

According to aspects of the invention, the location specification module 420 is configured to specify an initial location of the products 415 within the repository. In embodiments, the location specification module 420 provides a user interface (UI) via the backend system 405 or the user device 500 by which a user may provide input to define an initial location of the products 415 within the repository (e.g., a unique spatial location of every product 415 in the repository, defined, for example, relative to a coordinate system in the repository). The input may be visual, textual, and/or physical, and is used by the user to define respective locations of each respective product 115 in the repository. In one example, the user may provide text input (e.g., that defines coordinates) for the location of each product. In another example, the user may use the UI to drag and drop visual representations of products 415 at locations in the repository. In another example, the user may physically arrange the products 415 in a desired initial arrangement in the repository, and then utilize the sensors (e.g., the fixed sensors 410 and the product sensors 412) to determine the locations of all the products 415, where the determined locations define the initial locations of the products 415.

In embodiments, the location specification module 420 communicates with the fixed sensors 410 and the product sensors 412 so that the sensors are provided with the specified locations of the products 415. In embodiments, this includes the fixed sensors 410 being made aware of the locations of the products 415, as well as the product sensors 412 being notified of their own locations as well as the locations of all other products with specified locations (e.g., along with the distance, computed as Euclidean distance between that product and all other products).

According to aspects of the invention, the arrangement computing module 425 is configured to determine an initial arrangement of the products 415 in the repository based on the initial locations of the products 415 from the location specification module 420. In embodiments, the initial arrangement of the products 415 includes an absolute arrangement of the products 415 (e.g., defined relative to locations in the repository) and a relative arrangement of the products 415 (e.g., defined relative to locations of other products). In implementations, the arrangement computing module 425 stores data defining the initial arrangement in a product location database 435, which may be included in or separate from the backend system 405. In embodiments, the arrangement computing module 425 is configured to re-determine the arrangement of the products 415 based on receiving an indication of a change in product location from the location specification module 420. For example, after specifying the initial locations and determining the initial arrangement, the user may wish to change the location of one or more products 415 in the repository (e.g., to change the arrangement). In this example, the user provides input to the location specification module 420 to define the new location of one or more products 415, and the location specification module 420 provides the new location information to the arrangement computing module 425, which then re-determines the arrangement of the products 415 based on the initial arrangement and the new location information.

According to aspects of the invention, the arrangement checking module 440 is configured to determine and track the real time arrangement of all the products 415 in the repository. In embodiments, the arrangement checking module 440 receives (or obtains) the initial arrangement of the products 415 from the product location database 435. In embodiments, the arrangement checking module 440 receives (or obtains) real time data from the fixed sensors 410 and the product sensors 412 that defines a real-time current location of each product 415 in the repository. The location of any given product 415 as defined in the initial arrangement is referred to as its home location. In embodiments, the arrangement checking module 440 compares the home location of a given product 415 to its current location as defined by the real time sensor data. In the event the arrangement checking module 440 determines that a particular product is not currently at its home location (based on this comparing), then that product is deemed to be at a visiting location. In this situation, the arrangement checking module 440 stores data in the product location database 435, the data defining the product identifier, the visiting location, and the time (e.g., timestamp) the product is determined as being at the visiting location.

In accordance with additional aspects of the invention, the arrangement checking module 440 is configured to periodically check the relative arrangement of the products 415 (e.g., relative to one another) using the current locations of the products as determined by the sensors. In embodiments, the arrangement checking module 440 computes a first count of the products 415 for which the relative distance of the product to another product has not changed, and a second count of the products 415 for which the relative distance of the product to another product has changed. In aspects, the arrangement checking module 440 stores data defining the counts, and the respective products included in the counts, in the product location database 435.

According to aspects of the invention, the misplacement determining module 445 is configured to determine when a deviation from the initial arrangement satisfies conditions to trigger an alert. In embodiments, the misplacement determining module 445 accesses data from the product location database 435 to identify any product 415 that has been away from its home location (e.g., at one or more visiting locations) for a time that exceeds a pre-defined threshold amount of time. For any such identified product, the misplacement determining module 445 also determines from the data of the product location database 435 the count of other products for which the location of this identified product relative to the other products has changed, and determines whether this count exceeds a pre-defined threshold count. For any such identified product, the misplacement determining module 445 also determines from a sales database 430 whether the identified product has been sold. In accordance with aspects of the invention, the misplacement determining module 445 triggers a misplacement event for any such identified product that has not been sold and for which the count exceeds the threshold count. In this manner, the misplacement determining module 445 analyzes the data in the databases 435 and 430 and identifies any product that satisfies the conditions including: the product is away from its home location for more than a threshold amount of time; the count of other products for which the relative distance to this product has changed exceeds the threshold count; and the product has not been sold.

In embodiments, the sales database 430 stores data defining which products 415 have been sold. For example, when a customer purchases one of the products 415 at a point of sale terminal in the repository, that point of sale terminal stores data in the sales database 430 indicating that the product has been sold. In implementations, the data stored in the sales database 430 includes the product identifier and the date and time the product was sold. In this manner, the misplacement determining module 445 may query the sales database 430 with the product identifier of a product 415 that has been away from its home location to determine if that particular product has been sold.

According to aspects of the invention, the alerting module 450 is configured to generate an alert based on the misplacement event being triggered by the misplacement determining module 445. In embodiments, the alerting module 450 receives the indication of the misplacement event and the identifier of the product that is the subject of the misplacement event from the misplacement determining module 445, and in response generates an alert that is output to a user device 500. In implementations, the user device 500 is a computer device such as a laptop computer, desktop computer, smartphone, or a specialized computer device used in the repository (e.g., a point of sale terminal, specialized inventory computer device, etc.). In aspects, the alert includes an audio and/or video alert that indicates the product that is the subject of the alert (e.g., via the product identifier) and the determined current location of the product within the repository. The alert can also include other information determined by the system such as the amount of time the product has been away from it home location, the determined count, etc. In this manner, a user of the system (e.g., a store manager) is alerted to the products in the repository being out of arrangement, and the user can take corrective action.

In accordance with additional aspects of the invention, the backend system 405 is configured to perform a product visibility assurance function. In embodiments, this function is carried out using the visibility calibrating module 455, the computation module 460, and the current visibility module 465.

According to aspects of the invention, the visibility calibrating module 455 is configured to determine an initial visibility of each product 415 in the repository by estimating its relative location in the store with respect to the rack it is placed in, the other products within the rack, the size of the given product, the size of the other products within the rack, the relative locations of other products in the rack, and an initial estimate of visibility. In embodiments, the product locations are obtained from the database 435, the product sizes are obtained via input (e.g., manual and/or automated), and the initial estimate of visibility is a zone of visibility and portion of the product visible that is input to the system by a user such as a store manager.

According to aspects of the invention, the computation module 460 is configured to determine in real time the neighboring products for a particular product. In embodiments, the computation module 460 uses the current location of each product 415 to determine the neighboring products for a particular product. This information is useful for maintaining product visibility caused by incremental changes in product arrangements in the repository, e.g., when on product is moved away from another product, or when one product is replaced by another product.

According to aspects of the invention, the current visibility module 465 is configured to determine in real time the visibility of a product based on a detected movement of the product or another product. In embodiments, based on detecting that a product 415 has been moved from its home location, the current visibility module 465 determines the current visibility of the moved product and its neighboring products. For each such determination, the moved product's current location, the neighboring products' known locations, all the product sizes, and the earlier known zone of visibility for the current product are taken into account (e.g., as inputs to a visibility determining function). Using this information and defined projection geometry, the current visibility module 465 determines occlusions of one product by another when seen from the earlier determined zone of visibility. The visibility is then determined based on the determined occlusions. In this manner, the current visibility module 465 uses data from the visibility calibrating module 455 and the computation module 460 to determine a current visibility for a product and its neighboring products when a product is moved from its home location.

In embodiments, the current visibility module 465 compares the current visibility of a product to a threshold visibility value and generates an alert when the current visibility is less than the threshold visibility. In some implementations, the threshold visibility is equal to the initial visibility for this product as determined by the visibility calibrating module 455. In this manner, when the movement of any product 415 in the repository causes the visibility of that product or another product to drop below a threshold visibility value, then system then generates an alert that is sent to the user device 500 so that a user may take appropriate action to address the situation.

Figure 3:
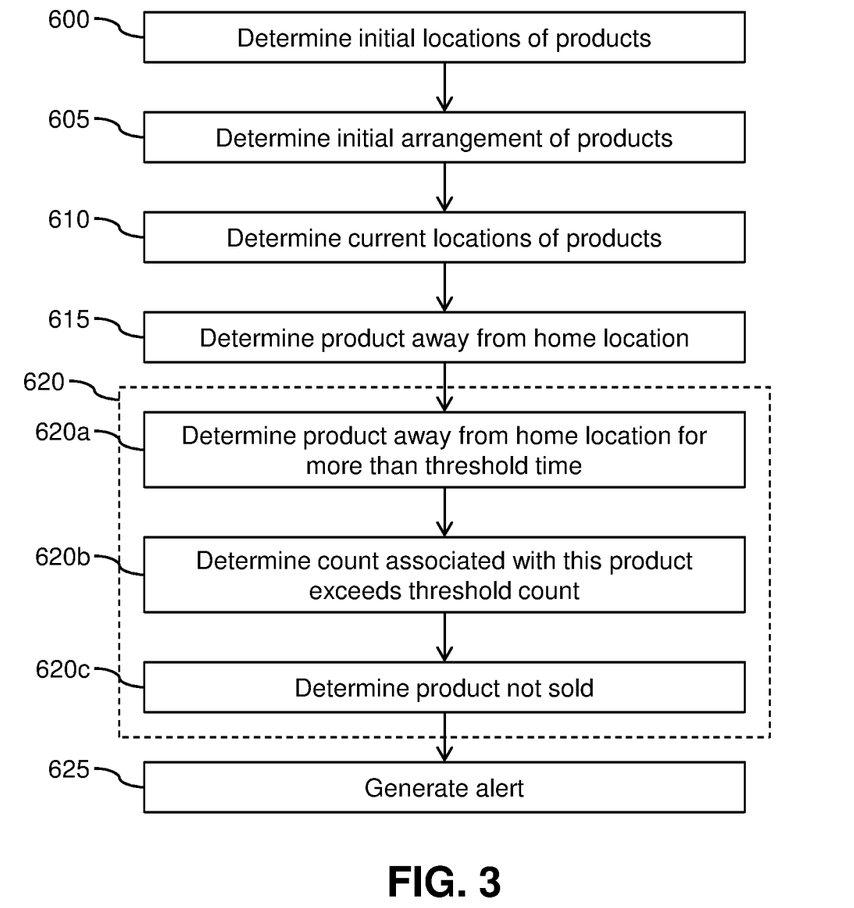
FIG. 3 shows a flowchart of an exemplary method in accordance with aspects of the invention.

FIG. 3 shows a flowchart of an exemplary method in accordance with aspects of the present invention. Steps of the method may be carried out in the environment described in FIG. 2, and are described with reference to elements depicted in FIG. 2.

At step 600, the system determines an initial location of all the products 415 in the repository. In embodiments, and as described with respect to FIG. 2, the location specification module 420 specifies an initial location of the products 415 within the repository.

At step 605, the system determines an initial arrangement of all the products 415 in the repository. In embodiments, and as described with respect to FIG. 2, the arrangement computing module 425 determines an initial arrangement of the products 415 in the repository based on the initial locations of the products 415 from step 600.

At step 610, the system determines current locations of all the products 415 in the repository. In embodiments, and as described with respect to FIG. 2, the arrangement checking module 440 obtains real time data from the fixed sensors 410 and the product sensors 412 that defines a real-time current location of each product 415 in the repository.

At step 615, the system determines that a particular product is away from its home location. In embodiments, and as described with respect to FIG. 2, the arrangement checking module 440 compares the home location of a given product 415 to its current location (from step 610). In the event the arrangement checking module 440 determines that a particular product is not currently at its home location (based on this comparing), then that product is deemed to be at a visiting location and the arrangement checking module 440 stores data defining the product identifier, the visiting location, and the time (e.g., timestamp) the product is determined as being at the visiting location.

At step 620, the system determines that the product identified at step 615 is misplaced based on conditions being satisfied. In embodiments, and as described with respect to FIG. 2, the misplacement determining module 445 determines whether conditions are satisfied for triggering an alert for the product identified at step 615. At step 620a, and as described with respect to FIG. 2, the misplacement determining module 445 accesses data from the product location database 435 to identify any product 415 that has been away from its home location (e.g., at one or more visiting locations) for a time that exceeds a pre-defined threshold amount of time. At step 620b, and as described with respect to FIG. 2, the misplacement determining module 445 also determines from the data of the product location database 435 the count of other products for which the location of this identified product relative to the other products has changed, and determines whether this count exceeds a pre-defined threshold count. At step 620c, and as described with respect to FIG. 2, the misplacement determining module 445 also determines from a sales database 430 whether the identified product has been sold. In this manner, the misplacement determining module 445 determines whether the product identified at step 615 satisfies the conditions including: the product is away from its home location for more than a threshold amount of time; the count of other products for which the relative distance to this product has changed exceeds the threshold count; and the product has not been sold. The system determines that the product identified at step 615 is misplaced based on determining that these conditions are satisfied.

At step 625, the system generates an alert. In embodiments, and as described with respect to FIG. 2, the alerting module 450 is configured to generate an alert based on the misplacement event being triggered at step 620. As described herein, the alert includes an audio and/or video alert that indicates the product that is the subject of the alert (e.g., via the product identifier) and the determined current location of the product within the repository. The alert can also include other information determined by the system such as the amount of time the product has been away from it home location, the determined count, etc.

Figure 4:
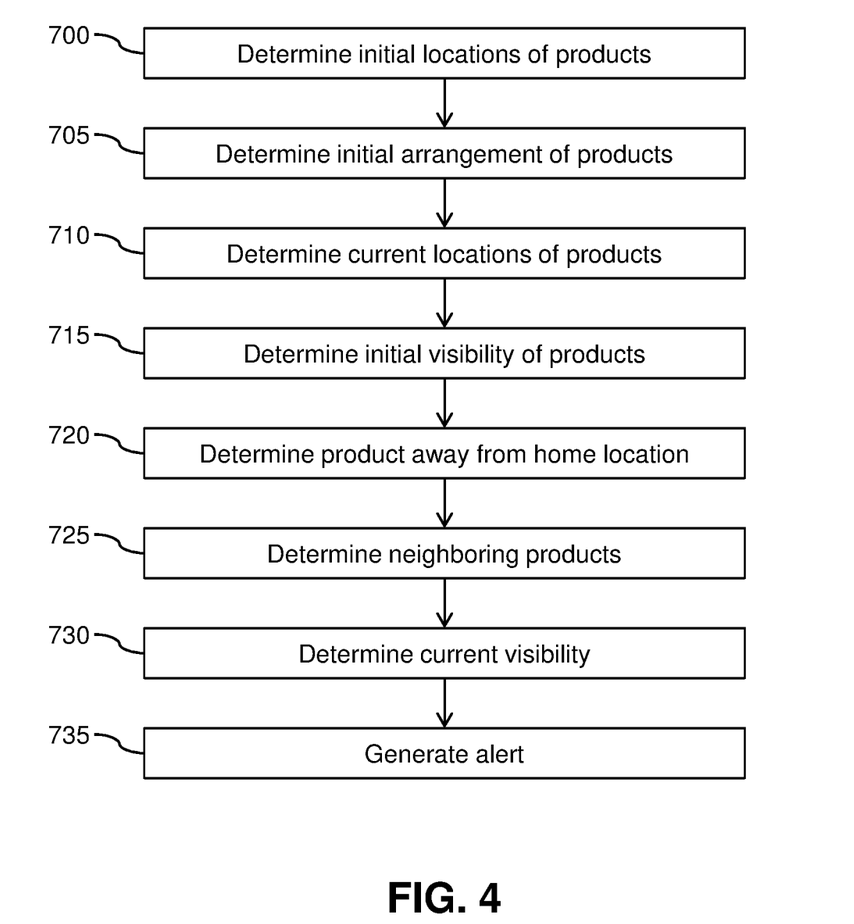
FIG. 4 shows a flowchart of an exemplary method in accordance with aspects of the invention.

FIG. 4 shows a flowchart of an exemplary method in accordance with aspects of the present invention. Steps of the method may be carried out in the environment of FIG. 2 and are described with reference to elements depicted in FIG. 2.

Steps 700, 705, and 710 are performed in the same manner as steps 600, 605, and 610, respectively, as described with respect to FIG. 6.

At step 715, the system determines the visibility of the products 415 in the repository. In embodiments, and as described with respect to FIG. 2, the visibility calibrating module 455 is configured to determine an initial visibility of each product 415 in the repository by estimating its relative location in the store with respect to the rack it is placed in, the other products within the rack, the size of the given product, the size of the other products within the rack, the relative locations of other products in the rack, and an initial estimate of visibility.

Step 720 is performed in the same manner as step 615 as described with respect to FIG. 6, and is used to identify a product that has been moved away from its home location.

At step 725, the system determines neighboring products for the product identified as moved at step 720. In embodiments, and as described with respect to FIG. 2, the computation module 460 uses the current location of each product 415 to determine the neighboring products for a particular product.

At step 730, the system determines current visibility of the moved product (from step 720) and the neighboring products (from step 725). In embodiments, and as described with respect to FIG. 2, the current visibility module 465 determines the current visibility of the moved product and its neighboring products based on the moved product's current location, the neighboring products' known locations, all the product sizes, and the earlier known zone of visibility for the current product are taken into account (e.g., as inputs to a visibility determining function).

At step 735, the system generates an alert. In embodiments, and as described with respect to FIG. 2, the current visibility module 465 compares the current visibility of a product to a threshold visibility value and generates an alert when the current visibility is less than the threshold visibility.

As should be apparent from the description provided herein, an embodiment of the invention is directed to a system comprising: a network interface; and a processor communicatively coupled to the network interface; wherein the processor is configured to output, via the network interface, a respective initial designated location in a store for a plurality of products, wherein the initial designated location is output to each of a plurality respective sensors affixed to the plurality of products; wherein the processor is further configured to: receive via the network interface a respective current location of the plurality of products; determine that one of the plurality of products is misplaced based on the received respective current location of the products; and in response to determining that one of the plurality of products is misplaced, outputting an alert identifying the misplaced product. In embodiments, the processor is configured to determine that one of the plurality of products is misplaced based on: determining that the misplaced product is not located at its initial designated location for more than a first threshold time period; determining that a number of products with respect to which a relative location of the misplaced product has changed is greater than a second threshold; and determining that a product ID corresponding to the respective sensor affixed to the misplaced product is not listed in a sales database. In additional embodiments, the initial designated location is output to each of a plurality of static sensors located at respective pre-determined locations in the store. In further embodiments, the processor is configured to estimate an initial visibility of a first product of the plurality of products based on a relative location of the first product in the store with respect to a rack on which the first product is placed, relative locations of other products of the plurality of products located on the rack, a size of the first product, and a respective size of the other products on the rack.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    determining, by a computer device, initial locations of products in a repository;
    determining, by the computer device, an initial arrangement of the products based on the initial locations;
    determining in real-time, by the computer device, current locations of the products in the repository, wherein the determining the current locations of the products is performed using data from: (i) plural fixed-location sensors in the repository; and (ii) plural product sensors attached to respective ones of the products;
    determining in real-time, by the computer device and based on the initial locations and the current locations, that one of the products is moved away from its home location;
    determining in real-time, by the computer device and based on the determining the one of the products is moved away from its home location, that the one of the products is misplaced based on predefined conditions being satisfied; and
    generating, by the computer device, an alert based on the determining the one of the products is misplaced,
    wherein the determining the one of the products is misplaced comprises:
        determining the one of the products is away from its home location for more than a first threshold amount of time;
        determining a count of other ones of the products for which a relative distance to the one of the products has changed, and determining the count of other ones of the products for which a relative distance to the one of the products exceeds a threshold count value;
        determining the one of the products is at a current location different from the initial location and is not moving for a second threshold amount of time in the repository; and
        determining the one of the products has not been sold.

2. The method of claim 1 wherein the determining the current locations of the products comprises obtaining data from plural fixed-location sensors in the repository, further comprising determining an absolute arrangement of the products in the repository relative to the repository from the data from plural fixed-location sensors in the repository.

3. The method of claim 1 wherein the determining the current locations of the products comprises obtaining the data from the plural product sensors attached to respective ones of the products, further comprising determining a relative arrangement of the products relative to the location of other products in the repository from the data from plural product sensors attached to respective ones of the products.

4. The method of claim 1 wherein the determining the current locations of the products comprises:
    obtaining the data from: (i) the plural fixed-location sensors in the repository; and (ii) the plural product sensors attached to respective ones of the products; and
    triangulating the current locations using data from the plural product sensors attached to respective ones of the products.

5. The method of claim 1, wherein the alert is transmitted to a user device and causes the user device to display:
    an identifier of the one of the products; and
    the current location of the one of the products.

6. The method of claim 1, further comprising, for each of the respective products, determining an initial visibility of the respective product in the repository based on:
    a relative location of the respective product in the store with respect to a rack the respective product is placed in;
    other ones of the products within the rack;
    a size of the respective product;
    a size of the other ones of the products within the rack;
    locations of fixed-location sensors within the repository;
    relative locations of other ones of the products in the rack; and
    an initial estimate of visibility of the respective product.

7. The method of claim 6, further comprising:
    determining another one of the products is moved to a new location relative to its initial location;
    determining neighboring products of the another one of the products; and
    determining current visibility for the another one of the products and the neighboring products based on the initial visibility and the new location, wherein the determining current visibility includes determining if a smaller product is behind a larger product.

8. A computer program product, the computer program product comprising a computer readable storage medium having program instructions embodied therewith, the program instructions executable by a computer device to cause the computer device to:
    determine initial locations of products in a repository;
    determine an initial arrangement of the products based on the initial locations wherein the determining an initial arrangement of the products includes communicating the locations of the products with plural fixed-location sensors and communicating a location of a product of the products, the locations of all other products of the products, and a Euclidean distance between the location of the product and the locations of all the other products and a Euclidean distance between the location of the products and the plural fixed-location sensors, to each plural product sensors;
    determine current locations of the products in the repository using data from: (i) the plural fixed-location sensors in the repository; and (ii) the plural product sensors attached to respective ones of the products;
    determine, based on the initial locations and the current locations, that one of the products is moved away from its home location;
    determine, based on the determining the one of the products is moved away from its home location and based on predefined conditions being satisfied, that the one of the products is misplaced; and
    generate an alert based on the determining the one of the products is misplaced,
    wherein the determining the one of the products is misplaced comprises:
        determining the one of the products is away from its home location for more than a threshold amount of time;
        determining a count of other ones of the products for which a relative distance to the one of the products has changed, and determining the count exceeds a threshold count value; and
        determining the one of the products has not been sold, and wherein the program instructions cause the computer device to, for each of the respective products, determine an initial visibility of the respective product in the repository based on:
- a relative location of the respective product in the store with respect to a rack the respective product is placed in;
- other ones of the products within the rack;
- a size of the respective product;
- a size of the other ones of the products within the rack;
- relative locations of other ones of the products in the rack; and
- an initial estimate of visibility of the respective product, wherein the program instructions cause the computer device to:
- determine another one of the products is moved to a new location relative to its initial location;
- determine neighboring products of the another one of the products; and
- determine current visibility for the another one of the products and the neighboring products based on the initial visibility and the new location.

9. The computer program product of claim 8, wherein the determining the current locations of the products comprises:
- obtaining the data from: (i) the plural fixed-location sensors in the repository; and (ii) the plural product sensors attached to respective ones of the products; and
- triangulating using data from the plural fixed-location sensors in the repository and the plural product sensors attached to respective ones of the products.

10. The computer program product of claim 8, wherein the alert is transmitted to a user device and causes the user device to display:
- an identifier of the one of the products; and
- the current location of the one of the products.

11. A system, comprising:
- a processor, a computer readable memory, and a computer readable storage medium;
- program instructions to determine initial locations of products in a repository, including an initial location of one of the products, wherein the initial location of the one of the products is defined by coordinates relative to a local coordinate system of the repository;
- program instructions to determine an initial arrangement of the products based on the initial locations;
- program instructions to determine current locations of the products in the repository, including a current location of the one of the products, wherein the determining the current locations of the products is performed using data from: (i) plural fixed-location sensors in the repository; and (ii) plural product sensors attached to respective ones of the products, wherein the current locations of the products are additionally based on sensor coordinates of the plural fixed-location sensors and the plural product sensors;
- program instructions to determine, based on comparing the initial location of the one of the products to the current location of the one of the products, that the one of the products is moved away from its home location;
- program instructions to timestamp the determination that the one of the products is moved away from its home location;
- program instructions to determine, based on the determining the one of the products is moved away from its home location and based on predefined conditions being satisfied, that the one of the products is misplaced; and
- program instructions to generate an alert based on the determining the one of the products is misplaced, wherein the determining the one of the products is misplaced comprises:
- determining the one of the products is away from its home location for more than a threshold amount of time;
- determining a count of other ones of the products for which a relative distance to the one of the products has changed, and determining the count exceeds a threshold count value; and
- determining the one of the products has not been sold, and wherein the program instructions are stored on the computer readable storage medium for execution by the processor via the computer readable memory.

12. The system of claim 11, further comprising program instructions to determine: (i) another count of other ones of the products for which a relative distance to the one of the products has not changed
- wherein the determining the one of the products is away from its home location for more than a threshold amount of time based on comparing the current time and the timestamp on the determination that the one of the products is moved away from its home location.

13. The system of claim 11, wherein the alert is transmitted to a user device and causes the user device to display:
- an identifier of the one of the products; and
- the current location of the one of the products.

14. The system of claim 11, further comprising program instructions to, for each of the respective products, determine an initial visibility of the respective product in the repository based on:
- a relative location of the respective product in the store with respect to a rack the respective product is placed in;
- other ones of the products within the rack;
- a size of the respective product;
- a size of the other ones of the products within the rack;
- relative locations of other ones of the products in the rack; and
- an initial estimate of visibility of the respective product.

15. The system of claim 14, further comprising program instructions to:
- determine in real-time another one of the products is moved to a new location relative to its initial location;
- determine in real-time neighboring products of the another one of the products;
- determine in real-time current visibility for the another one of the products and the neighboring products based on the initial visibility, occlusion to the initial visibility, and the new location, wherein the occlusion to the initial visibility is determined from the defined projection geometry and the initial visibility;
- compare the current visibility of the another one of the products and a threshold visibility; and
- generate an alert when the current visibility of the another one of the products is less than the threshold visibility.

16. The system of claim 11, wherein:
- each respective one of the plural product sensors stores an identifier that defines the respective product to which the respective one of the plural product sensor is attached; and each respective one of the plural product sensors is an image sensor.

17. The system of claim 11, wherein:

each respective one of the plural product sensors stores an identifier that defines the respective product to which the respective one of the plural product sensor is attached; and each respective one of the plural product sensors is a proximity sensor.

18. The system of claim 11, wherein:

each respective one of the plural product sensors stores an identifier that defines the respective product to which the respective one of the plural product sensor is attached; and each respective one of the plural product sensors is a motion detection sensor.

19. The system of claim 11, wherein:

each respective one of the plural product sensors stores an identifier that defines the respective product to which the respective one of the plural product sensor is attached; and each respective one of the plural product sensors is an ultrasonic sensor.

\* \* \* \* \*